US012781583B2

(12) United States Patent
Su et al.

(10) Patent No.: US 12,781,583 B2
(45) Date of Patent: Nov. 3, 2026

(54) PRESSURE-PRESERVED CORING TOOL, USE METHOD, AND RESERVOIR ANALYSIS METHOD

(71) Applicants: China National Petroleum Corporation, Beijing (CN); CNPC Greatwall Drilling Company, Beijing (CN)

(72) Inventors: Yang Su, Panjin (CN); Shaoliang Sun, Panjin (CN); Ren Wang, Beijing (CN); Jun Luo, Panjin (CN); Shangwen Zhou, Beijing (CN); Mengyu Xie, Panjin (CN); Boyi Xia, Beijing (CN); Xianggang Duan, Beijing (CN); Yang Jiao, Panjin (CN); Liang Tang, Panjin (CN); Chenchen Dong, Panjin (CN); Li Wen, Panjin (CN)

(73) Assignees: CHINA NATIONAL PETROLEUM CORPORATION, Beijing (CN); CNPC GREATWALL DRILLING COMPANY, Beijing (CN)

( * ) Notice: Subject to any disclaimer, the term of this patent is extended or adjusted under 35 U.S.C. 154(b) by 0 days.

(21) Appl. No.: 19/109,167

(22) PCT Filed: Sep. 8, 2023

(86) PCT No.: PCT/CN2023/117629

§ 371 (c)(1),
(2) Date: Mar. 6, 2025

(87) PCT Pub. No.: WO2024/051797

PCT Pub. Date: Mar. 14, 2024

(65) Prior Publication Data

US 2026/0078647 A1 Mar. 19, 2026

(30) Foreign Application Priority Data

Sep. 9, 2022 (CN) ........................ 202211105166.0

(51) Int. Cl.
*E21B 25/08* (2006.01)
*E21B 25/10* (2006.01)
*G01N 24/08* (2006.01)

(52) U.S. Cl.
CPC .............. *E21B 25/08* (2013.01); *E21B 25/10* (2013.01); *G01N 24/081* (2013.01)

(58) Field of Classification Search
CPC .......... E21B 25/10; E21B 25/08; E21B 25/02; E21B 25/00; E21B 10/02; E21B 10/06
See application file for complete search history.

(56) References Cited

U.S. PATENT DOCUMENTS 4,356,872 A * 11/1982 Hyland .................. E21B 25/08 175/239
6,006,844 A * 12/1999 Van Puymbroeck ... E21B 47/00 73/152.43
6,216,804 B1 4/2001 Aumann et al.
8,162,080 B2 * 4/2012 Castillo .................. E21B 25/10 175/50

(Continued)

FOREIGN PATENT DOCUMENTS

CN 102507626 A 6/2012
CN 204344034 U 5/2015

(Continued)

OTHER PUBLICATIONS

International Search Report from PCT/CN2023/117629 dated Nov. 22, 2023.

*Primary Examiner* — Yong-Suk (Philip) Ro
(74) *Attorney, Agent, or Firm* — Calfee, Halter & Griswold LLP

(57) ABSTRACT

The present invention relates to the field of drilling coring devices. Disclosed are a pressure-preserved coring tool, a use method, and a reservoir analysis method. The pressure-preserved coring tool comprises an outer cylinder (1), a differential assembly (2), a pressure-preserving inner cylinder assembly (4), and a seal assembly (5). The differential assembly is configured to be able to drive the pressure-pre- (Continued)

serving inner cylinder assembly to move upwards relative to the seal assembly, so that the seal assembly seals the inner cylinder assembly for accommodating a rock core (8). Therefore, in the process of taking out a drilled rock core to the ground, the pressure state of the rock core in an in-situ formation can be preserved in the inner cylinder assembly, so that important information, such as physical properties and fluid distribution characteristics of reservoirs under in-situ formation conditions, is obtained by means of, for example, a nuclear magnetic resonance-based analysis and test method, thereby supporting efficient exploration and development of oil and gas resources.

13 Claims, 5 Drawing Sheets

(56) References Cited

U.S. PATENT DOCUMENTS

| | | | | |
|---|---|---|---|---|
| 11,131,147 | B1 * | 9/2021 | Berger .................... | E21B 10/02 |
| 11,891,858 | B2 * | 2/2024 | Berger .................... | E21B 10/02 |
| 2012/0234607 | A1 * | 9/2012 | Kinsella .................. | E21B 25/02<br>175/403 |
| 2017/0089158 | A1 | 3/2017 | Gupta et al. | |

FOREIGN PATENT DOCUMENTS

| | | | |
|---|---|---|---|
| CN | 208619037 | U | 3/2019 |
| CN | 110552644 | A | 12/2019 |
| CN | 209780816 | U | 12/2019 |
| CN | 110700781 | A | 1/2020 |
| CN | 216429539 | U | 5/2022 |
| CN | 115822492 | A | 3/2023 |

* cited by examiner

PRESSURE-PRESERVED CORING TOOL, USE METHOD, AND RESERVOIR ANALYSIS METHOD

CROSS REFERENCE TO RELATED APPLICATION

The present application claims the benefits of Chinese Patent Application No. 202211105166.0 filed on Sep. 9, 2022, the content of which is incorporated herein by reference.

FIELD

The present disclosure relates to borehole coring devices, in particular to a pressure-preserved coring tool. On that basis, the present disclosure further relates to a reservoir analysis system comprising the pressure-preserved coring tool. In addition, the present disclosure further relates to a reservoir analysis method.

BACKGROUND

The pressure-preserved coring technique can keep a rock core in the pressure state in the original formation, effectively prevents the loss of oil and gas components and the change of pore structures in the rock core, and thus truly reflects the physical properties, mechanical properties and fluid distribution characteristics of reservoirs. It is the key to find out oil and gas-bearing areas and promote the development and utilization of oil and gas resources that are complex and difficult to recover by utilizing pressure-preserved rock cores to test physical properties and gas-bearing properties, realize in-situ collection of rock cores of oil reservoirs, and accurately describe the law of storage distribution and physical property change of underground rock cores. In recent years, the application field of the pressure-preserved coring technique has covered unconventional oil and gas fields such as natural gas hydrates, shale gas, shale oil, coalbed methane and tight gas. The coring effect and pressure-preserving ability of the technique have been proved in the field, and the technique has solved the problem of accurate evaluation and calculation of reserve volumes of oil and gas fields and realized quantitative evaluation of gas contents in shale reservoirs.

In the research on the physical properties, fluid phase state and distribution characteristics of reservoirs, the original state characteristics of rock cores are difficult to observe and evaluate, because they may vary with the external environment owing to the influence of various physical, chemical and geological conditions. At present, although reservoir samples under original formation conditions can be taken out with the pressure-preserved coring technique, it is necessary to release the pressure of pressure-preserved rock cores before the rock cores can be taken out for analysis, owing to imperfect associated testing techniques. As a result, the original state of the reservoir may be changed, consequently the real reservoir information can't be obtained, and the purpose of in-situ exploration can't be achieved. In shale gas, shale oil, natural gas hydrates and other hot fields, the physical properties and fluid distribution characteristics of reservoirs have become a focus and a difficult task in geological evaluation. Especially, for natural gas hydrates, the drilling and exploitation process will affect the stability of the hydrates in the seabed formation, thereby change the physical and mechanical properties of the formation where the hydrates exist around the borehole wall, and may possibly cause dynamic changes of the geological and ecological environment in the nearby seabed and sub-seabed strata, even induce complex situations such as submarine landslide and continental margin collapse. The law of hydrate decomposition and fluid migration will directly affect reservoir damage, reservoir reformation and geological disaster assessment.

SUMMARY

An object of the present disclosure is to provide a pressure-preserved coring tool, which can effectively take out a rock core in the formation and preserve the pressure state of the rock core in the in-situ formation, so as to obtain important information, such as physical properties and fluid distribution characteristics of the reservoir, under in-situ formation conditions with appropriate analysis and testing methods, and support efficient exploration and development of oil and gas resources.

To attain the above object, in an aspect, the present disclosure provides a pressure-preserved coring tool, which comprises:

an outer cylinder with an axially extending hollow cavity formed therein;

a differential assembly having a first pitching joint that is connected to a first end of the outer cylinder and extends in the hollow cavity and a differential joint that is socket-connected to the first pitching joint and has an axial relative position defined by a first shear pin, wherein a pressure cavity is arranged inside the differential joint, a first fluid channel with a first ball seat is formed in the first pitching joint, and the first fluid channel is in communication with the pressure cavity through a first diversion hole penetrating through a circumferential wall of the first pitching joint; when the pressure in the pressure cavity reaches a first predetermined value, the first shear pin will be cut off, so that the differential joint will move along the first pitching joint toward the first end of the outer cylinder;

a pressure-preserving inner cylinder assembly, which is connected to an end of the differential joint away from the first end of the outer cylinder through a drive connection so as to be able to move in an axial direction along with the differential joint, and has an inner cylinder assembly for accommodating a rock core; and a seal assembly, which is arranged at an end of the inner cylinder assembly away from the differential assembly and has a seal cover that is arranged to close an accommodating space of the inner cylinder assembly at a second end of the outer cylinder after the pressure-preserving inner cylinder assembly moves toward the first end of the outer cylinder along with the differential joint.

Preferably, the pressure-preserved coring tool further comprises a downhole rock core cleaning assembly connected between the differential assembly and the pressure-preserving inner cylinder assembly, and the downhole rock core cleaning assembly is arranged to be able to clean the rock core contained in the inner cylinder assembly by being driven to inject a cleaning solvent into the inner cylinder assembly, wherein the cleaning solvent is a perfluoro solvent. Before the seal cover is closed, the drilling fluid wrapping the rock core is washed and replaced with a perfluoro solvent that doesn't contain hydrogen atoms. After the rock core is wrapped in the perfluoro solvent, it is brought to the ground for nuclear magnetic resonance test, and all the test signals come from the oil, gas and water signals in the rock core. Thus, the problem of signal interference during the nuclear magnetic resonance test is solved.

Preferably, the differential assembly is provided with a second pitching joint that is socket-connected into the first pitching joint and has an axial relative position defined by a second shear pin, a second fluid channel that is in communication with the first fluid channel and has a second ball seat is formed in the second pitching joint, and the radial dimension of the second ball seat is smaller than that of the first ball seat; the ultimate shear strength of the second shear pin is smaller than that of the first shear pin, so that when the pressure in the second fluid channel reaches a second predetermined value that is smaller than the first predetermined value, the second shear pin will be cut off, thus, the second pitching joint will slide along the first pitching joint toward the downhole rock core cleaning assembly, thereby drive the downhole rock core cleaning assembly to inject the cleaning solvent into the inner cylinder assembly.

In a second aspect, the present disclosure provides a reservoir analysis system, which comprises a nuclear magnetic resonance analyzer and the abovementioned pressure-preserved coring tool, wherein the pressure-preserving inner cylinder assembly and the seal assembly can be integrally placed in the nuclear magnetic resonance analyzer.

In a third aspect, the present disclosure provides a reservoir analysis method, which comprises:

S1. drilling a rock core in a reservoir with the pressure-preserved coring tool, wherein, before the seal cover is closed, the drilling fluid wrapping the rock core can be washed and replaced with a perfluoro solvent that doesn't contain hydrogen atoms, and then the seal cover is closed, thus, a rock core preserved in the original pressure state in the reservoir can be taken out;

S2. taking out the pressure-preserving inner cylinder assembly and the seal assembly integrally from the pressure-preserved coring tool, while preserving the pressure in the accommodating space of the inner cylinder assembly; and S3. placing the pressure-preserving inner cylinder assembly and the seal assembly in combination in a nuclear magnetic resonance analyzer for testing, wherein the combination of the pressure-preserving inner cylinder assembly and the seal assembly placed in the nuclear magnetic resonance analyzer has nuclear magnetic compatibility; thus, the nuclear magnetic resonance analyzer doesn't generate magnetic attraction to the pressure-preserving inner cylinder assembly and the seal assembly in the testing process.

In a fourth aspect, the present disclosure provides a method for using the abovementioned pressure-preserved coring tool, which comprises the following steps:

S1. lowering the pressure-preserved coring tool to the bottom of a borehole, and drilling out a rock core, so that the rock core is loaded into the inner cylinder assembly;

S2. dismounting the drilling tool from the wellhead, throwing a first steel ball into a nozzle of the drilling tool, connecting the drilling tool, and starting a pump to deliver the first steel ball to the second ball seat to block the second fluid channel; thus, when the pressure in the second fluid channel reaches a second predetermined value smaller than the first predetermined value, the second shear pin will be cut off, so that the second pitching joint will slide along the first pitching joint toward the downhole rock core cleaning assembly, thereby drive the downhole rock core cleaning assembly to inject the cleaning solvent into the inner cylinder assembly;

S3. dismounting the drilling tool from the wellhead, throwing a second steel ball into the nozzle of the drilling tool, connecting the drilling tool, and starting the pump to deliver the second steel ball to the first ball seat, so that the pressure in the pressure cavity reaches a first predetermined value under the action of the fluid introduced through the first fluid channel, so as to cut off the first shear pin and drive the pressure-preserving inner cylinder assembly to move toward the first end of the outer cylinder;

S4. closing the accommodating space of the inner cylinder assembly by closing the opening with the seal cover after the pressure-preserving inner cylinder assembly moves toward the first end of the outer cylinder along with the differential joint, to seal and store the rock core in the inner cylinder assembly; and S5. taking out the pressure-preserving inner cylinder assembly to the ground, wherein the pressure state of the rock core in the in-situ formation is preserved in the inner cylinder assembly.

With the technical scheme described above, after the pressure-preserved coring tool in the present disclosure is lowered to the bottom of a borehole and obtains a rock core, the rock core is sealed and stored in the inner cylinder assembly of the pressure-preserving inner cylinder assembly by means of the seal assembly; then, the pressure in the pressure cavity reaches a first predetermined value under the action of the fluid introduced through the first fluid channel, thereby the first shear pin is cut off, and the pressure-preserving inner cylinder assembly and the rock core sealed and stored therein move toward the first end of the outer cylinder; at that point and in the subsequent process of taking the pressure-preserving inner cylinder assembly to the ground, the pressure state of the rock core in the in-situ formation can be preserved in the inner cylinder assembly, so as to obtain important information, such as physical properties and fluid distribution characteristics of the reservoir, under the in-situ formation conditions with analysis and testing methods such as nuclear magnetic resonance, and support efficient exploration and development of oil and gas resources.

REFERENCE NUMERALS

1—outer cylinder; 11—outer cylinder joint; 12—outer cylinder body; 13—coring bit;

2—differential assembly; 21—first pitching joint; 21*a*—first fluid channel; 21*b*—first ball seat; 21*c*—first diversion hole; 22—second pitching joint; 22*a*—second fluid channel; 22*b*—second ball seat; 22*c*—third diversion hole; 23—differential joint; 23*a*—pressure cavity; 23*b*—second diversion hole; 23*c*—fourth diversion hole; 24—first shear pin; 25—second shear pin;

3—downhole rock core cleaning assembly; 31—drive rod; 31*a*—third fluid channel; 31*b*—fifth diversion hole; 32—cylinder; 321—upper cylinder part; 321*a*—sixth diversion hole; 322—lower cylinder part; 33—piston; 34—solvent cavity; 35—check valve;

4—pressure—preserving inner cylinder assembly; 41—upper joint; 42—glass fiber tube; 43—lower joint; 44—switch valve; 45—rock core claw base; 45*a*—seventh diversion hole; 45*b*—diversion channel; 46—rock core claw;

5—seal assembly; 51—seal cover; 52—mounting base; 53—sealed bin; 54—torsional spring; 55—fixing pin; 56—annular groove;

6—second steel ball; 7—first steel ball; 8—rock core.

DETAILED DESCRIPTION

Some embodiments of the present disclosure will be detailed below with reference to the accompanying drawings. It may be understood that the embodiments described herein are only provided to describe and explain the present disclosure, but are not intended to constitute any limitation on the present disclosure.

In the present disclosure, unless otherwise specified, the terms that denote the orientations are used as follows, for example, "top", "bottom", "left" and "right" usually refer to "top", "bottom", "left" and "right" as shown in the accompanying drawings; "inside" and "outside" refer to inside and outside in relation to the outlines of the components. In addition, as used in the present disclosure, the terms "first", "second", . . . , etc. are only used for distinguishing different parts and structures, but don't represent inevitable differences in shape, size, etc.

Figure 1:
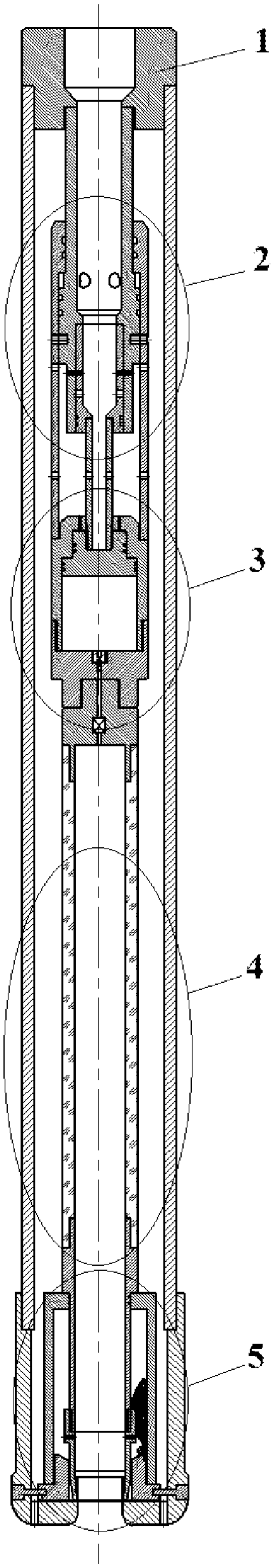
FIG. 1 is a sectional view of the overall structure of a pressure-preserved coring tool according to a preferred embodiment of the present disclosure.
Figure 2:
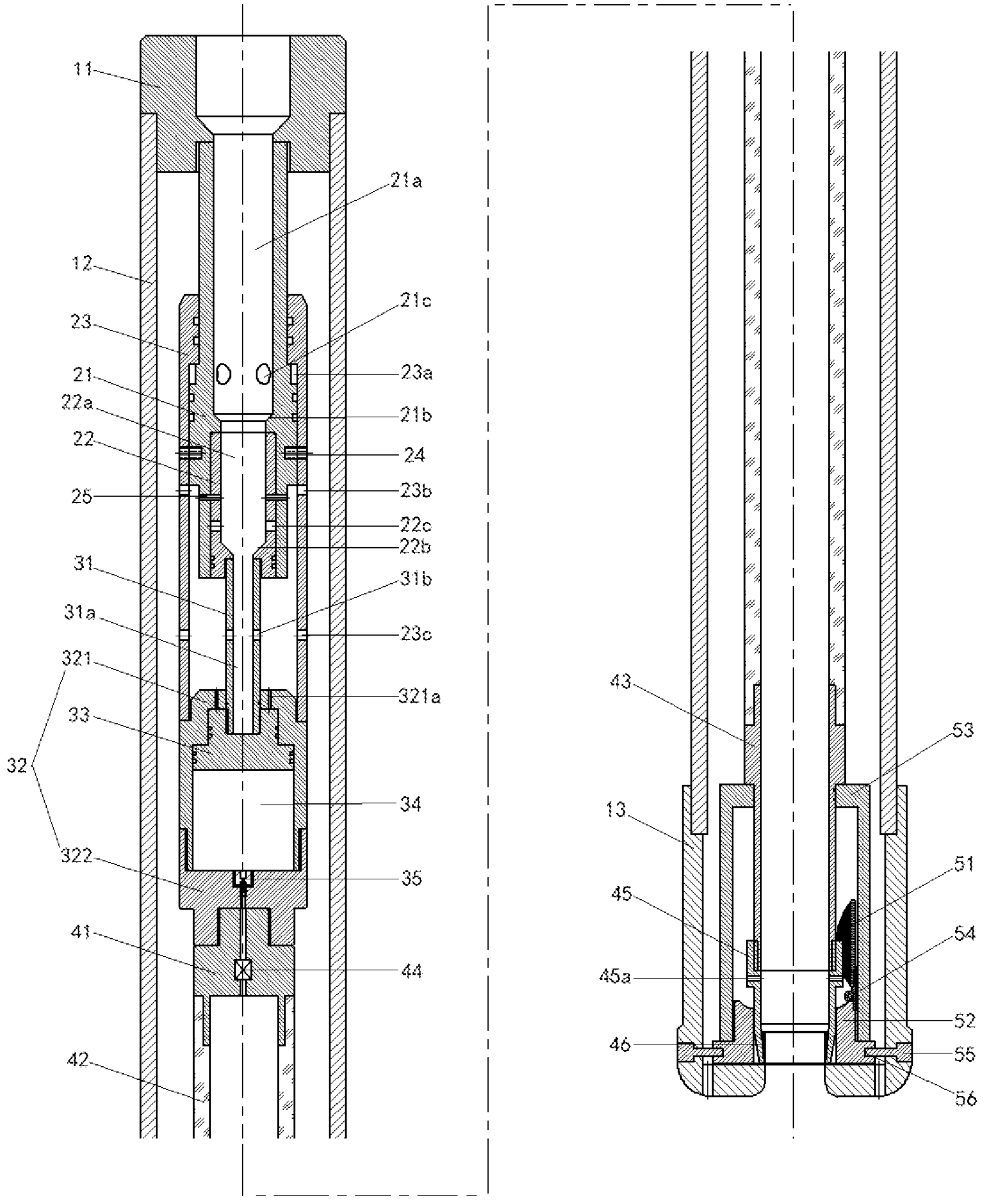
FIG. 2 is a sectional view of the pressure-preserved coring tool in FIG. 1, which is shown in sections, so that each part is displayed in an enlarged form.

As shown in FIG. 1, the pressure-preserved coring tool according to a preferred embodiment of the present disclosure can be generally divided into five parts: an outer cylinder 1, a differential assembly 2, a downhole rock core cleaning assembly 3, a pressure-preserving inner cylinder assembly 4 and a seal assembly 5. The outer cylinder 1 defines an axially extending hollow cavity in which other parts of the pressure-preserved coring tool extend, and the outer cylinder 1 may be provided with a rock core drilling element (e.g., a coring bit 13 as shown in FIG. 2) at its bottom end, so as to facilitate loading a rock core in the formation into the pressure-preserving inner cylinder assembly 4. The seal assembly 5 is used to seal the bottom end of the pressure-preserving inner cylinder assembly 4 after the rock core is loaded into the pressure-preserving inner cylinder assembly 4, so as to keep the environment where the rock core is located in the pressure state in the in-situ formation. Before the accommodation space of the pressure-preserving inner cylinder assembly 4 is sealed, the differential assembly 2 can be used to drive the downhole rock core cleaning assembly 3, so as to clean the rock core in the pressure-preserving inner cylinder assembly 4 downhole with a cleaning solvent such as a perfluoro solvent, and utilizes the cleaning solvent to displace the drilling fluid that enters the pressure-preserving inner cylinder assembly 4 with the rock core, which is beneficial for performing tests on the rock core for the physical properties and gas-bearing property of the rock core in the subsequent procedures, so as to accurately obtain important information such as physical properties and fluid distribution characteristics of the reservoir under in-situ formation conditions. Then, the differential assembly 2 can drive the pressure-preserving inner cylinder assembly 4 and the seal assembly 5 to rise in the outer cylinder 1 to move toward the first end of the outer cylinder. At this point and in the subsequent process of taking the pressure-preserving inner cylinder assembly 4 to the ground, the pressure state of the rock core in the in-situ formation can be preserved in the pressure-preserving inner cylinder assembly, so as to obtain important information such as physical properties and fluid distribution characteristics of the reservoir under the in-situ formation conditions with analysis and testing methods such as nuclear magnetic resonance, and support efficient exploration and development of oil and gas resources.

It may be noted that the downhole rock core cleaning assembly 3 is not required for preserving the rock core pressure. Therefore, the pressure-preserved coring tool of the present disclosure doesn't necessarily include the downhole rock core cleaning assembly 3; instead, the differential assembly 2 directly drives the pressure-preserving inner cylinder assembly 4 and the seal assembly 5 to leave the bottom of the borehole after the rock core is loaded into the pressure-preserving inner cylinder assembly 4, thus, the pressure-preserving inner cylinder assembly 4 can be directly connected to the differential assembly 2. Accordingly, the differential assembly 2 may only have components for lifting the pressure-preserving inner cylinder assembly 4 and the seal assembly 5 (e.g., the first ball joint 21 and the differential joint 23 described later with reference to FIG. 2), without other components for driving the downhole rock core cleaning assembly 3 (e.g., the second ball joint 22 described later with reference to FIG. 2).

The parts of the pressure-preserved coring tool in the present disclosure and the working process of the pressure-preserved coring tool are described below in detail:

Outer Cylinder 1

As shown in FIGS. 1 and 2, the outer cylinder 1 comprises an outer cylinder joint 11, an outer cylinder body 12 and a coring bit 13, which are sequentially connected from top to bottom. Thus, the outer cylinder joint 11 arranged at the first end of the outer cylinder 1 can be used to inject a drilling fluid and serve as a basis for connection of the differential assembly 2 at that end, and the injected drilling fluid can enter the bottom of the borehole through an annulus space in the outer cylinder body 12 and a through-hole in the coring bit 13. The coring bit 13 can be used as a basis for mounting the seal assembly 5, and may be made of a material with high hardness to destroy the borehole bottom structure and obtain a cylindrical rock core. The two ends of the outer cylinder body 12 can be connected to the outer cylinder joint 11 and the coring bit 13 respectively by means of threaded connections.

Differential Assembly 2

Please see FIGS. 1 and 2 further. The differential assembly 2 may comprise a first ball joint 21, a differential joint 23, and a second ball joint 22, etc., wherein the first ball joint 21 may be connected to the first end of the outer cylinder 1 (specifically, to the outer cylinder joint 11) and formed with a first fluid channel 21*a* with a first ball seat 21*b* therein, into which a fluid, such as a drilling fluid, can be introduced, so that the pressure in the first fluid channel 21*a* can be increased in a state where the first ball valve 6 (see FIG. 4) falls to the first ball seat 21*b*.

The differential joint 23 is socket-connected to the first pitching joint 21, so that the inner circumferential surface of the differential joint 23 is in sealing fit with the outer circumferential surface of the first pitching joint 21. The inner circumferential surface of the differential joint 23 and the outer circumferential surface of the first pitching joint 21 may be respectively formed with a stepped portion to form a pressure cavity 23*a* inside the differential joint 23, and the pressure cavity 23*a* is in communication with the first fluid channel 21*a* in the first pitching joint 21 through a first diversion hole 21*c* formed in the circumferential wall of the first pitching joint 21. Besides, the axial relative positions of the differential joint 23 and the first pitching joint 21 are defined by a first shear pin 24. When the fluid enters the pressure cavity 23*a* through the first fluid channel 21*a* and the first diversion hole 21*c*, the pressure in the pressure cavity 23*a* acts on the differential joint 23, so that the differential joint 23 has a tendency of sliding with respect to the first pitching joint 21, which generates a shear force on the first shear pin 24. When the pressure in the pressure cavity 23*a* rises to a first predetermined value, the generated shear force reaches the ultimate shear strength of the first shear pin 24, thereby cuts off the first shear pin 24, so that the differential joint 23 is driven to slide (upward) along the first pitching joint 21 toward the first end of the outer cylinder 1.

The second pitching joint 22 is socket-connected into the first pitching joint 21, so that the outer circumferential surface of the second pitching joint 22 is in sealing fit with the inner circumferential surface of the first pitching joint 21. A second fluid channel 22*a* is formed in the second pitching joint 22, and a second ball seat 22*b* is formed in the second fluid channel 22*a*. A fluid, such as a drilling fluid, can be introduced into the second fluid channel 22*a* through the first fluid channel 21*a*. In a state where the first steel ball 7 (see FIG. 4) falls to the second ball seat 22*b*, the pressure of the fluid can be applied to the first steel ball 7, so that the second pitching joint 22 has a tendency of sliding with respect to the first pitching joint 21, thereby a shear force is generated on the second shear pin 25. The axial relative positions of the second pitching joint 22 and the first pitching joint 21 are defined by a second shear pin 25. When the fluid pressure rises to a second predetermined value, the generated shear force reaches the ultimate shear strength of the second shear pin 25, thereby cuts off the second shear pin 25, so that the second pitching joint 22 is driven to slide downward toward downhole rock core cleaning assembly 3, thus, the cleaning solvent in the downhole rock core cleaning assembly 3 is discharged, as described later.

In the process of pressure-preserved coring, it is necessary to lift the combination of the pressure-preserving inner cylinder assembly 4 and the seal assembly 5 by means of the differential joint 23 after the rock core in the pressure-preserving inner cylinder assembly 4 is cleaned downhole with the downhole rock core cleaning assembly 3. Therefore, it is necessary to throw a first steel ball 7 and a second steel ball 6 into the drilling tool successively, and configure the second shear pin 25 to be cut off at a relatively low fluid pressure, and configure the first shear pin 24 to be cut off at a relatively high fluid pressure. To that end, the diameter of the second steel ball 6 may be greater than that of the first steel ball; accordingly, the radial dimension of the first ball seat 21*b* may be greater than that of the second ball seat 22*b*, and the diameter of the first fluid channel 21*a* may be greater than that of the second fluid channel 22*a*; besides, the ultimate shear strength of the first shear pin 24 may be greater than that of the second shear pin 25.

Figure 4:
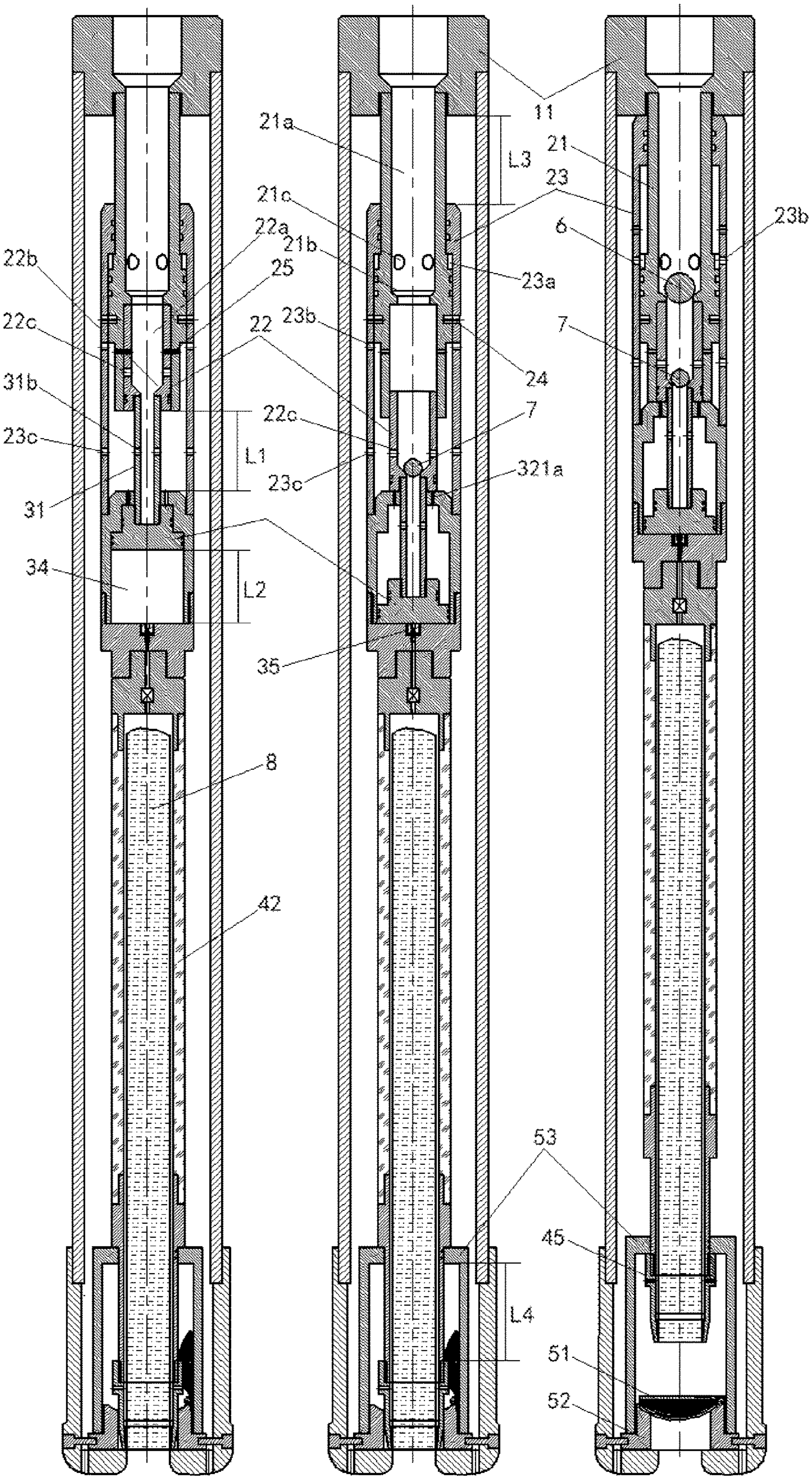
FIG. 4 shows the states of the pressure-preserved coring tool in FIG. 1 at different steps of the coring process.

In the differential assembly 2, in order to stop exerting upward or downward force on the differential joint 23 and the second ball joint 22 after the corresponding action is completed, it is necessary to release the pressure in the first fluid channel 21*a* and the second fluid channel 22*a* in time. To that end, a second diversion hole 23*b* may be formed in the circumferential wall of the differential joint 23, and a third diversion hole 22*c* may be formed in the circumferential wall of the second pitching joint 22. As shown in FIG. 4, under the pressure in the pressure cavity 23*a*, the differential joint 23 moves upward along the first pitching joint 21. When it moves to its upper limit position, the pressure cavity 23*a* is in communication with the annulus area on the periphery of the differential joint 23 through the second diversion hole 23*b*, so that the pressure in the pressure cavity 23*a* is released. In the initial state, the third diversion hole 22*c* is closed by the circumferential wall of the first pitching joint 21. When the second pitching joint 22 is driven downward to move to its lower limit position, the fluid pressure in the second fluid channel 22*a* can be released into the annulus area on the periphery of the differential joint 23 through the third diversion hole 22*c* and the fourth diversion hole 23*c* formed in the circumferential wall of the differential joint 23.

Downhole Rock Core Cleaning Assembly 3

Please see FIGS. 1 and 2 further. The downhole rock core cleaning assembly 3 may comprise a drive rod 31, a cylinder 32, and a piston 33, wherein the drive rod 31 may be connected to the second ball joint 22; one end of the cylinder 32 may be fixedly connected to the differential joint 23, and the other end of the cylinder 32 may be connected to the pressure-preserving inner cylinder assembly 4. A solvent cavity 34 is formed in the cylinder 32, and a cleaning solvent, such as a perfluoro solvent, may be stored in the solvent cavity 34. The piston 33 is slidably mounted in the solvent cavity 34 and is connected to the lower end of the drive rod 31 through a drive connection.

In the process that the rock core is loaded into the pressure-preserving inner cylinder assembly 4, all parts of the differential assembly 2 may be kept stationary with respect to each other and the drilling fluid may be delivered to the bottom of the borehole. To that end, the drive rod 31 may have a third fluid channel 31*a* formed therein and a fifth diversion hole 31*b* formed in its circumferential wall. Thus, before the second steel ball 6 and the first steel ball 7 are put into the boring tool, the drilling fluid introduced through the first fluid channel 21*a* can flow through the second fluid channel 22*a*, the third fluid channel 31*a*, the fifth diversion hole 31*b* and the fourth diversion hole 23*c* sequentially into the annulus area on the periphery of the differential joint 23, and then be delivered downward to the bottom of the borehole.

The cylinder 32 may be formed by an upper cylinder part 321 and a lower cylinder part 322 that are connected together, and a solvent cavity 34 is defined in the cylinder 32. The piston 33 can be pushed by the drive rod 31 to slide in the cylinder 32 to push the cleaning solvent out of the solvent cavity 34. In order to avoid a negative pressure in the area above the piston 33 in the pushing process, the upper cylinder part 321 may be formed with a sixth diversion hole 321*a*, one end of the sixth diversion hole 321*a* is in communication with the rod cavity on the upper part of the piston 33, and the other end of the sixth diversion hole 321*a* is in communication with the space between the drive rod 31 and the differential joint 23. A fluid channel for conveying the cleaning solvent may be formed in the lower cylinder part 322, and a check valve 35 may be provided in the fluid channel to allow the cleaning solvent to flow unidirectionally from the solvent cavity 34 to the pressure-preserving inner cylinder assembly 4.

Pressure-Preserving Inner Cylinder Assembly 4

Please see FIGS. 1 and 2 further. The pressure-preserving inner cylinder assembly 4 may comprise an inner cylinder assembly and a rock core claw base 45 connected to the inner cylinder assembly and provided with a rock core claw 46, wherein the inner cylinder assembly may consist of an upper joint 41, a glass fiber tube 42, a lower joint 43, etc., which are sequentially connected; the upper joint 41 is connected to the bottom end of the cylinder 32, and has a fluid channel for conveying the cleaning solvent formed therein; an switch valve 44 may be arranged in the fluid channel, and the switch valve 44 is opened when the cleaning solvent is injected by the downhole rock core cleaning assembly 3 into the inner cylinder assembly; when the pressure-preserving inner cylinder assembly 4 is detached from the downhole rock core cleaning assembly 3, the switch valve 44 can be closed to maintain the pressure in the inner cylinder assembly.

Figure 3:
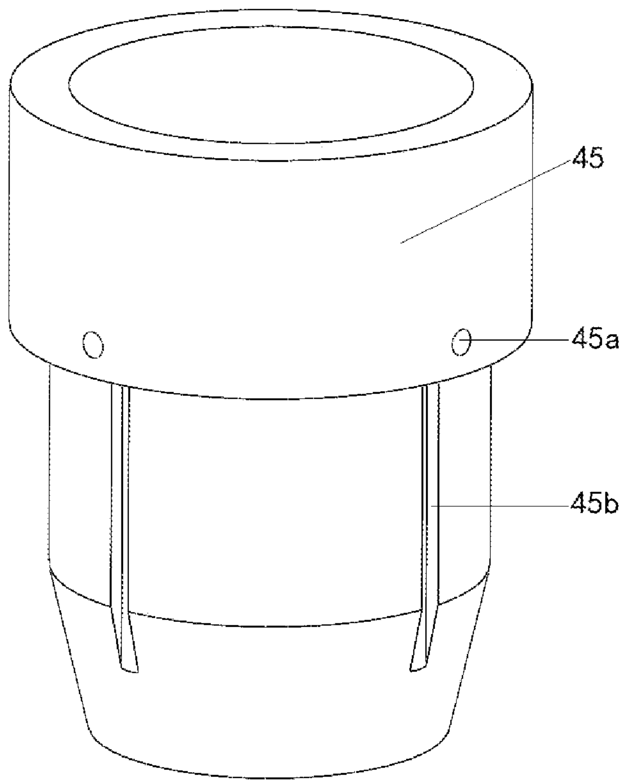
FIG. 3 is a schematic diagram of the three-dimensional structure of the rock core claw base of the pressure-preserved coring tool in FIG. 2.

The rock core claw base 45 may be connected to the lower end of the lower joint 43, and a rock core claw 46 is provided on the inner circumferential surface of the rock core claw base 45. In the cleaning process, it is necessary to discharge the drilling fluid that enters the inner cylinder assembly with the rock core. To that end, a drilling fluid discharge channel may be formed in the rock core claw base 45. FIG. 3 shows the three-dimensional structure of the rock core claw base 45, in which a seventh diversion hole 45*a* and a diversion channel 45*b* are formed in the circumferential wall of the rock core claw base 45 to allow the drilling fluid in the inner cylinder assembly to be discharged in the cleaning process.

The parts of the pressure-retaining inner cylinder assembly 4 may be made of a non-ferromagnetic alloy material, so that a nuclear magnetic resonance analysis can be performed in a state that the rock core is stored in the pressure-retaining inner cylinder assembly 4, without generating magnetic attraction.

Seal Assembly 5

Please see FIGS. 1 and 2 further. The seal assembly 5 comprises a mounting base 52 fixed to the coring bit 13, a sealed bin 53 mounted to the mounting base 52, and a seal cover 51, etc. The mounting base 52 is detachably mounted on the coring bit 13. For example, an annular groove 56 may be formed on the periphery of the mounting base 52, so that the position of the mounting base 52 can be defined by a fixing pin 55 that passes through the coring bit 13 and is fitted with the annular groove 56.

The sealed bin 53 may be mounted to the mounting base 52 through a threaded connection, and is in sealing fit with the outer circumferential surface of the inner cylinder assembly (the lower joint 43). The sealed bin 53 is arranged to allow the pressure-preserving inner cylinder assembly 4 to be driven upward by the differential assembly 2. A torsional spring 54 is arranged at a position where the seal cover 51 is connected with the mounting base 52, and the torsional spring 54 elastically abuts against the seal cover 51, so that the seal cover 51 can automatically close the opening of the mounting base 52 after the pressure-preserving inner cylinder assembly 4 moves upward with respect to the sealed bin 53, so as to seal the accommodating space of the inner cylinder assembly.

The seal cover 51, the mounting base 52 and the sealed bin 53 may be made of a non-ferromagnetic alloy, so that a nuclear magnetic resonance analysis can be performed on the rock core in a pressure-preserved state when the rock core is stored in the pressure-preserving inner cylinder assembly 4, without generating magnetic attraction.

Working Process

Please see FIG. 4. The pressure-preserved coring tool in the present disclosure is lowered to the bottom of a borehole to drill out a rock core 8, so that the rock core 8 is loaded into the inner cylinder assembly through the coring bit 13 and the seal assembly 5. In that process, the drilling fluid flows through the first fluid channel 21*a*, the second fluid channel 22*a*, the third fluid channel 31*a*, the fifth diversion hole 31*b* and the fourth diversion hole 23*c* into the annulus space, and then is delivered to the bottom of the borehole. After the rock core is drilled out, the pressure-preserved coring tool is lifted integrally to cut off the rock core.

The drilling tool is dismounted from the wellhead, a first steel ball 7 is thrown into the nozzle of the drilling tool, and a fluid is used to transport the first steel ball 7 to the second ball seat 22*b* to block the second fluid channel 22*a*. At that point, the pressure in the second fluid channel 22*a* increases slowly till it reaches a second predetermined value, and then the second shear pin 25 is cut off. Thus, the second ball joint 22 pushes the drive rod 31 and the piston 33 downward under the action of hydraulic pressure, and the perfluoro solvent in the solvent cavity 34 is injected into the inner cylinder assembly through the fluid channel provided with the check valve 35 and the switch valve 44, and the perfluoro solvents displaces the drilling fluid in the inner cylinder assembly, so that the drilling fluid is discharged through the seventh diversion hole 45*a* and the diversion channel 45*b*. In that process, the drilling fluid can enter the space above the piston 33 in the cylinder 32 through the sixth diversion hole 321*a*, so as to avoid a negative pressure in this space, which may affect the discharge of the cleaning solvent. The second pitching joint 22 moves downward by a first stroke L1, sits on top of the upper cylinder part 321, and blocks the sixth diversion hole 321*a*, thus playing a role of auxiliary sealing. Accordingly, the piston 33 is pushed downward by a second stroke L2, which is equal to the length of the first stroke L1, thereby liquid discharge and cleaning are completed. At the same time, when the second pitching joint 22 moves downward to the lower limit position on top of the upper cylinder part 321, the third diversion hole 22*c* in the second pitching joint 22 slides out of an extension area of the first pitching joint 21 and is exposed, thus, the fluid in the second fluid channel 22*a* can enter the annulus space through the third diversion hole 22*c* and the fourth diversion hole 23*c* in the differential joint 23, and the cleaning procedure is completed.

Next, the drilling tool is dismounted from the wellhead, a second steel ball 6 is thrown into the nozzle of the drilling tool, the drilling tool is connected, and a fluid is used to transport the second steel ball 6 to the first ball seat 21*b* to block the first fluid channel 21*a*. At that point, the pressure in the first fluid channel 21*a* and the pressure cavity 23*a* in communication with first fluid channel 21*a* through the first diversion hole 21*c* increases till it reaches a first predetermined value, and then the first shear pin 24 is cut off. Thus, the differential joint 23 drives the downhole rock core cleaning assembly 3, the pressure-preserving inner cylinder assembly 4 and the seal assembly 5 to move upward under the action of hydraulic pressure. In that process, the differential joint 23 moves upward by a third stroke L3 till the second diversion hole 23*b* is exposed to the pressure cavity 23*a*, so that the pressure in the first fluid channel 21*a* and the pressure cavity 23*a* is released to the annulus space through the second diversion hole 23*b*, and the differential joint 23 slides to its upper limit position, thus, the differential procedure is completed. In that process, the axial positions of the mounting base 52 and the sealed bin 53 are defined by a fixing pin 55, and the pressure-preserving inner cylinder assembly 4 is driven to move up with respect to the seal assembly 5 by a fourth stroke L4, and the length of the fourth stroke L4 is equal to that of the third stroke L3. In addition, the length of the fourth stroke LA may be equal to that of the first stroke L1, so that the second pitching joint 22 is restored to its initial position after the differential procedure is completed. After the pressure-preserving inner cylinder assembly 4 is driven to move up with respect to the seal assembly 5, the seal cover 51 closes the opening of the mounting base 52 under the action of the torsional spring 54, so that the accommodating space of the inner cylinder assembly is sealed to maintain the pressure.

Figure 5:
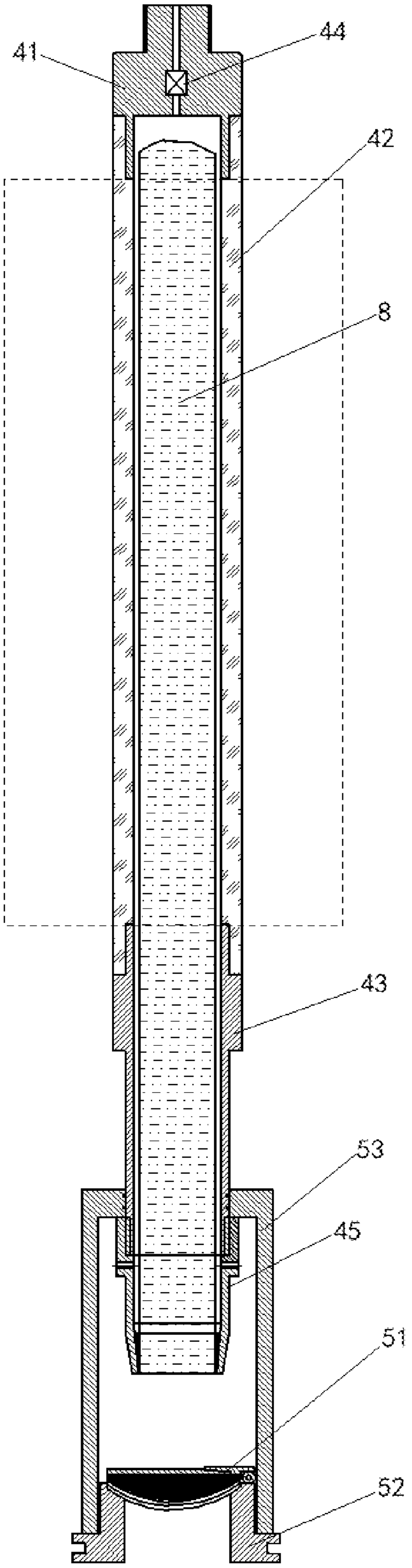
FIG. 5 is a combination of the pressure-preserving inner cylinder assembly and the seal assembly for nuclear magnetic resonance analysis, in which a rock core is stored in a sealed state.

After the rock core is obtained, the pressure-preserved coring tool is lifted to the ground, the coring bit 13 is removed from the outer cylinder body 12, and the switch valve 44 is closed. The combination of the differential assembly 2, the downhole rock core cleaning assembly 3, the pressure-preserving inner cylinder assembly 4 and the seal assembly 5 is taken out, and the differential assembly 2 and the downhole rock core cleaning assembly 3 are removed, so as to perform analysis, for example, a nuclear magnetic resonance analysis, on the combination of pressure-preserving inner cylinder assembly 4 and seal assembly 5. FIG. 5 shows the combination of the pressure-preserving inner cylinder assembly 4 and the seal assembly 5 containing the rock core 8. The combination can be integrally placed in a nuclear magnetic resonance analyzer to perform nuclear magnetic resonance analysis on the rock core 8 (shown in the dotted part) in the glass fiber tube 42. In view that the coring and testing process doesn't cause any damage to the rock core sample and is time-saving and efficient, testing and data acquisition can be accomplished without taking out the rock core after the rock core sample is obtained. Especially, the pore structure and fluid characteristics of the rock core are close to those in the pressure state in the in-situ formation after the rock core is transported to the ground in the pressure-preserved state. Now, scanning and testing can be carried out on the rock core to obtain more real reservoir information and attain the purpose of in-situ exploration.

With the pressure-preserved coring tool provided by the present disclosure, the rock core can be maintained in the in-situ formation pressure state as far as possible, non-destructive, rapid and accurate testing and analysis can be carried out for the rock core in the pressure-preserved state through nuclear magnetic resonance, to detect nuclear magnetic resonance relaxation signals of hydrogen-containing fluids (methane, water, oil, etc.) in the pores of the rock core, so that important information, such as pore structure and fluid distribution, can be reflected, the pore distribution and fluid migration in the rock core can be visualized, and in-situ reservoir evaluation can be accomplished, thereby the problem of assessment on the physical properties and fluid phase state of the reservoir under in-situ formation conditions can be solved.

The present disclosure further provides a reservoir analysis system comprising the abovementioned pressure-preserved coring tool and a reservoir analysis method using the pressure-preserved coring tool. First, a rock core can be obtained from a reservoir with the pressure-preserved coring tool in the present disclosure, and the pressure in the accommodating space of the inner cylinder assembly is maintained by means of the pressure-preserving inner cylinder assembly 4 and the seal assembly 5 in the coring process; then, nuclear magnetic resonance analysis can be carried out for the combination of the pressure-preserving inner cylinder assembly 4 and the seal assembly 5 with a nuclear magnetic resonance analyzer, so that the pore distribution and fluid migration inside the rock core can be visualized.

While some preferred embodiments of the present disclosure are described above in detail with reference to the accompanying drawings, the present disclosure is not limited to those embodiments. Various simple variations may be made to the technical scheme of the present disclosure, including combinations of the specific technical features in any appropriate form, within the scope of the technical ideal of the present disclosure. To avoid unnecessary repetitions, various possible combinations are not described specifically in the present disclosure. However, such simple variations and combinations shall also be deemed as having been disclosed herein and falling in the scope of protection of the present disclosure.

The invention claimed is:

1. A pressure-preserved coring tool, comprising:

an outer cylinder with an axially extending hollow cavity formed therein, wherein the outer cylinder has a first end and a second end; and a differential assembly, a downhole rock core cleaning assembly, a pressure-preserving inner cylinder assembly and a seal assembly that are arranged from top to bottom in the hollow cavity in series, wherein the pressure-preserving inner cylinder assembly as an inner cylinder assembly for accommodating a rock core, the inner cylinder assembly comprises a glass fiber tube and an upper joint and a lower joint respectively connected to two ends of the glass fiber tube, the upper joint and the lower joint are non-ferromagnetic alloy parts, wherein the downhole rock core cleaning assembly is arranged to clean the rock core contained in the inner cylinder assembly by injecting a cleaning solvent into the inner cylinder assembly when driven by the differential assembly, and moves the pressure-preserving inner cylinder assembly toward the first end of the outer cylinder after completing cleaning, the seal assembly is arranged to close an accommodating space of the inner cylinder assembly at the second end of the outer cylinder after the pressure-preserving inner cylinder assembly moves toward the first end of the outer cylinder, and wherein the differential assembly has a first pitching joint that is connected to a first end of the outer cylinder and extends in the hollow cavity and a differential joint that is socket-connected to the first pitching joint and has an axial relative position defined by a first shear pin, wherein a pressure cavity is arranged inside the differential joint, a first fluid channel with a first ball seat is formed in the first pitching joint, and the first fluid channel is in communication with the pressure cavity through a first diversion hole penetrating through a circumferential wall of the first pitching joint; when the pressure in the pressure cavity reaches a first predetermined value, the first shear pin is cut off, so that the differential joint moves along the first pitching joint toward the first end of the outer cylinder;

the pressure-preserving inner cylinder assembly is connected to an end of the differential joint away from the first end of the outer cylinder through a drive connection so as to move in an axial direction along with the differential joint; and the seal assembly has a seal cover that is arranged to close the accommodating space of the inner cylinder assembly at a second end of the outer cylinder after the pressure-preserving inner cylinder assembly moves toward the first end of the outer cylinder along with the differential joint.

2. The pressure-preserved coring tool of claim 1, wherein the outer cylinder comprises an outer cylinder body, and an outer cylinder joint and a coring bit that are connected to two ends of the outer cylinder body respectively, wherein the first pitching joint is connected to the outer cylinder joint, and the seal assembly is mounted on the coring bit and in sealing fit with an outer circumferential surface of the inner cylinder assembly.

3. The pressure-preserved coring tool of claim 2, wherein the seal assembly has a mounting base fixed to the coring bit and a sealed bin connected to the mounting base and in sealing fit with the outer circumferential surface of the inner cylinder assembly, the mounting base is formed with an opening that allows the rock core to pass therethrough into the inner cylinder assembly, the seal cover is mounted to the mounting base via a torsional spring, so that the seal cover closes the accommodating space of the inner cylinder assembly by closing the opening after the pressure-preserving inner cylinder assembly moves toward the first end of the outer cylinder along with the differential joint, wherein all of the sealed bin, the mounting base and the seal cover are non-ferromagnetic alloy parts.

4. The pressure-preserved coring tool of claim 1, wherein the differential joint is formed with a second diversion hole penetrating through its circumferential wall, and, when the differential joint slides toward the first end of the outer cylinder to an upper limit position, the pressure cavity is in communication with an annulus area on the periphery of the differential joint through the second diversion hole.

5. The pressure-preserved coring tool of claim 1, wherein the cleaning solvent is a perfluoro solvent.

6. The pressure-preserved coring tool of claim 1, wherein the differential assembly is provided with a second pitching joint that is socket-connected into the first pitching joint and has an axial relative position defined by a second shear pin, a second fluid channel that is in communication with the first fluid channel and has a second ball seat is formed in the second pitching joint, and the radial dimension of the second ball seat is smaller than that of the first ball seat; the ultimate shear strength of the second shear pin is smaller than that of the first shear pin, so that when the pressure in the second fluid channel reaches a second predetermined value that is smaller than the first predetermined value, the second shear pin is cut off, thus, the second pitching joint slides along the first pitching joint toward the downhole rock core cleaning assembly, thereby drive the downhole rock core cleaning assembly to inject the cleaning solvent into the inner cylinder assembly.

7. The pressure-preserved coring tool of claim 6, wherein the second pitching joint is formed with a third diversion hole penetrating through its circumferential wall, and the differential joint is formed with a fourth diversion hole penetrating through its circumferential wall at a position corresponding to a joint between the differential assembly and the downhole rock core cleaning assembly; when the second pitching joint slides toward the downhole rock core cleaning assembly to a lower limit position, the second fluid channel is in communication with the annulus area on the periphery of the differential joint via the third diversion hole and the fourth diversion hole sequentially.

8. The pressure-preserved coring tool of claim 6, wherein the downhole rock core cleaning assembly has a cylinder that is connected between the differential joint and the inner cylinder assembly and formed with a solvent cavity and a piston that is slidably mounted in the cylinder and connected to the second pitching joint via a drive rod, and the cleaning solvent is contained in the solvent cavity and can be injected into the inner cylinder assembly when the piston moves along with the second pitching joint.

9. The pressure-preserved coring tool of claim 8, wherein a third fluid channel in communication with the second fluid channel is formed in the drive rod, and a circumferential wall of the drive rod is formed with a fifth diversion hole that extends through the circumferential wall of the drive rod and is used for releasing the pressure in the first fluid channel and the second fluid channel.

10. The pressure-preserved coring tool of claim 8, wherein the cylinder comprises an upper cylinder part and a lower cylinder part that are butt-jointed to form the solvent cavity, and the upper cylinder part is formed with a sixth diversion hole in communication with a rod cavity and a space between the drive rod and the differential joint.

11. The pressure-preserved coring tool of claim 8, wherein a fluid control valve is arranged in the fluid channel between the solvent cavity and the accommodating space of the inner cylinder assembly.

12. The pressure-preserved coring tool of claim 11, wherein the upper joint is connected to the cylinder, and the fluid control valve comprises a switch valve arranged in the upper joint.

13. The pressure-preserved coring tool of claim 12, wherein the lower joint is connected with a rock core claw base, a rock core claw is arranged on an inner wall surface of the rock core claw base, and a seventh diversion hole and/or a diversion channel are/is formed in a circumferential wall of the rock core claw base, the rock core claw base is a non-ferromagnetic alloy part.

* * * * *